(12) United States Patent
Ge

(10) Patent No.: US 8,564,562 B2
(45) Date of Patent: Oct. 22, 2013

(54) ELECTRONIC DEVICE WITH FUNCTION OF RECOGNIZING MULTI-TOUCH INPUTS AND METHOD THEREOF

(75) Inventor: Chi-Sheng Ge, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 327 days.

(21) Appl. No.: 13/097,084

(22) Filed: Apr. 29, 2011

(65) Prior Publication Data

US 2012/0249432 A1   Oct. 4, 2012

(30) Foreign Application Priority Data

Mar. 30, 2011   (TW) .............................. 100110875 A

(51) Int. Cl.
*G06F 3/041* (2006.01)

(52) U.S. Cl.
USPC .................... 345/173; 345/179; 178/18.01

(58) Field of Classification Search
USPC ..................... 345/173–179; 178/18.01–18.04
See application file for complete search history.

(56) References Cited

U.S. PATENT DOCUMENTS

| | | | | |
|---|---|---|---|---|
| 4,845,346 A | * | 7/1989 | Ouchi et al. ................. | 250/221 |
| 2007/0273660 A1 | * | 11/2007 | XiaoPing ..................... | 345/173 |
| 2008/0012835 A1 | * | 1/2008 | Rimon et al. ................. | 345/173 |
| 2009/0122030 A1 | * | 5/2009 | Morimoto et al. ........... | 345/179 |
| 2010/0079393 A1 | * | 4/2010 | Dews ............................ | 345/173 |
| 2010/0188356 A1 | * | 7/2010 | Vu et al. ....................... | 345/173 |

* cited by examiner

*Primary Examiner* — Kimnhung Nguyen
(74) *Attorney, Agent, or Firm* — Altis & Wispro Law Group, Inc.

(57) ABSTRACT

An electronic device with a function of recognizing multi-touch inputs includes a multi-touch display unit, an input unit receiving multi-touch inputs on the multi-touch display unit, a storage unit, and a processing unit. Each multi-touch input includes a plurality of touch points which forms a touch area. The storage unit stores a table which records a relationship between an area of the touch area of the multi-touch input and a function of the electronic device. The processing unit senses whether there is a multi-touch input on the display unit, computes the area of the touch area of the multi-touch input when there is a multi-touch input on the multi-touch display unit, and determines a function associated with the computed area in the table stored in the storage unit.

5 Claims, 3 Drawing Sheets

ELECTRONIC DEVICE WITH FUNCTION OF RECOGNIZING MULTI-TOUCH INPUTS AND METHOD THEREOF

BACKGROUND

1. Technical Field

The present disclosure relates to electronic devices and, particularly, to an electronic device with a function of recognizing multi-touch inputs and a method thereof.

2. Description of Related Art

Electronic devices with touch displays capable of detecting user inputs in the form of touch inputs and touch gestures are becoming increasingly common. There are icons usually displayed on the touch display, and each corresponds to one function. When the user touches one icon on the touch display, the touch is recognized and the function corresponding to the touch is performed. However, when the user wants to simultaneously perform various functions, many icons must be touched, it is inconvenient for the user.

Therefore, what is needed is an electronic device with a function of recognizing multi-touch inputs to overcome the described limitations.

DETAILED DESCRIPTION

In general, the word "module," as used herein, refers to logic embodied in hardware or firmware, or to a collection of software instructions, written in a programming language, for example, Java, C, or Assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage system.

Figure 1:
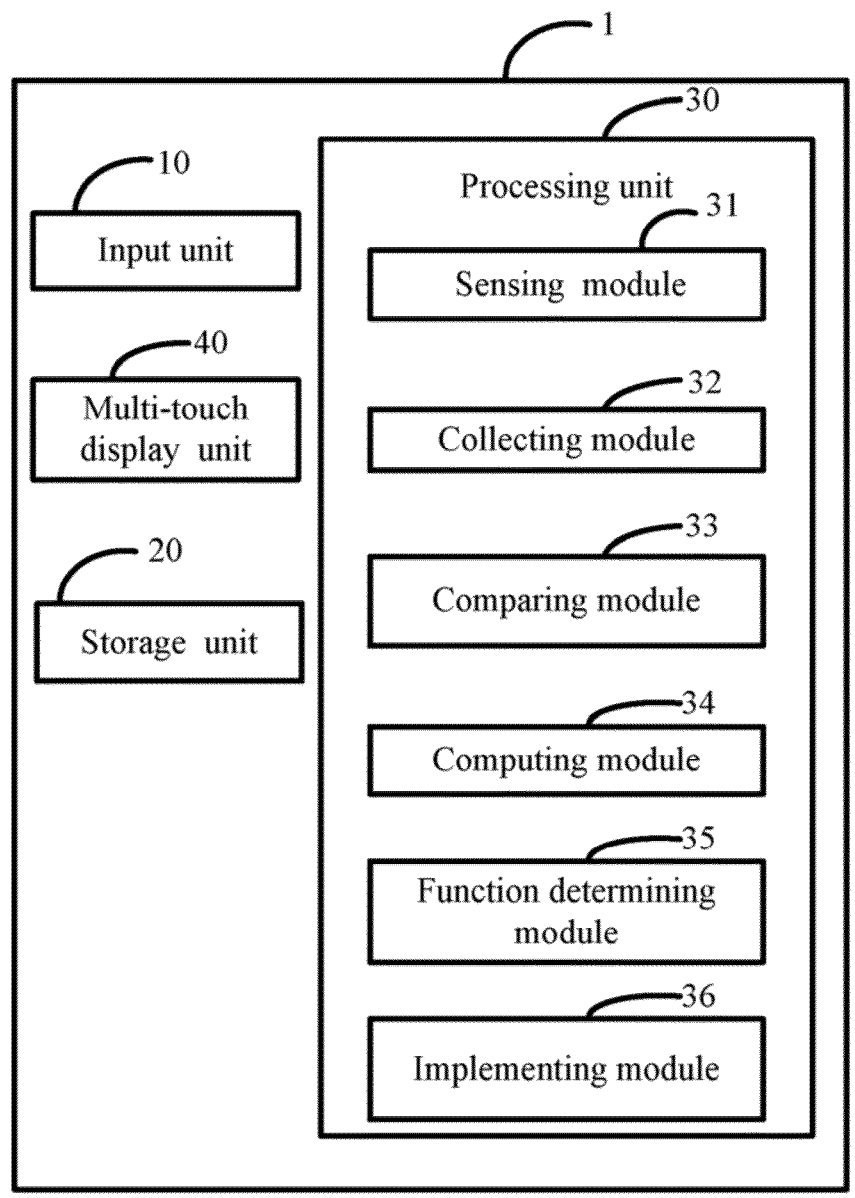
FIG. 1 is a block diagram of a hardware infrastructure of an electronic device with a function of recognizing multi-touch inputs, in accordance with an exemplary embodiment.

Referring to FIG. 1, an electronic device 1 with a function of recognizing multi-touch inputs is illustrated. The electronic device 1 includes an input unit 10, a storage unit 20, a processing unit 30, and a multi-touch display unit 40. The input unit 10 is configured to receive multi-touch inputs on the multi-touch display unit 40. Each multi-touch input includes a number of touch points which forms a touch area. The storage unit 20 is configured to store a table, which records a relationship between an area of the touch area of the multi-touch input on the multi-touch display unit 40 and a function of the electronic device 1, such as zooming.

The processing unit 30 executes one or more computerized codes of the electronic device 1 and other applications, to provide the functions of the electronic device 1. In some embodiments, the processing unit 30 includes a sensing module 31, a collecting module 32, a comparing module 33, a computing module 34, a function determining module 35, and an implementing module 36. The modules 31-36 may include computerized code in the form of one or more programs that are stored in the storage unit 20. The computerized code includes instructions that are executed by the processing unit 30 to provide functions for modules 31-36.

The sensing module 31 is configured to sense whether there is a multi-touch input on the multi-touch display unit 40.

The collecting module 32 is configured to determine the number of touch points of the multi-touch input when there is a multi-touch input on the multi-touch display unit 40, and collect a coordinate value of each touch point.

The comparing module 33 is configured to compare the coordinate values of the number of touch points to determine the minimum x and y coordinate values and the maximum x and y coordinate values.

The computing module 34 is configured to compute the area of the touch area of the multi-touch input according to the determined minimum x and y coordinate values and the determined maximum x and y coordinate values. In one embodiment, the computing module 34 is configured to compute a x difference between the maximum x coordinate value and the minimum x coordinate value, compute a y difference between the maximum y coordinate value and the minimum y coordinate value, and compute a result of the x difference multiplying the y difference which is defined as the area of the touch area of the multi-touch input.

The function determining module 35 is configured to determine a function associated with the determined area in the table stored in the storage unit 20.

The implementing module 36 is configured to execute a corresponding operation on the electronic device 1 according to the determining function.

Figure 2:
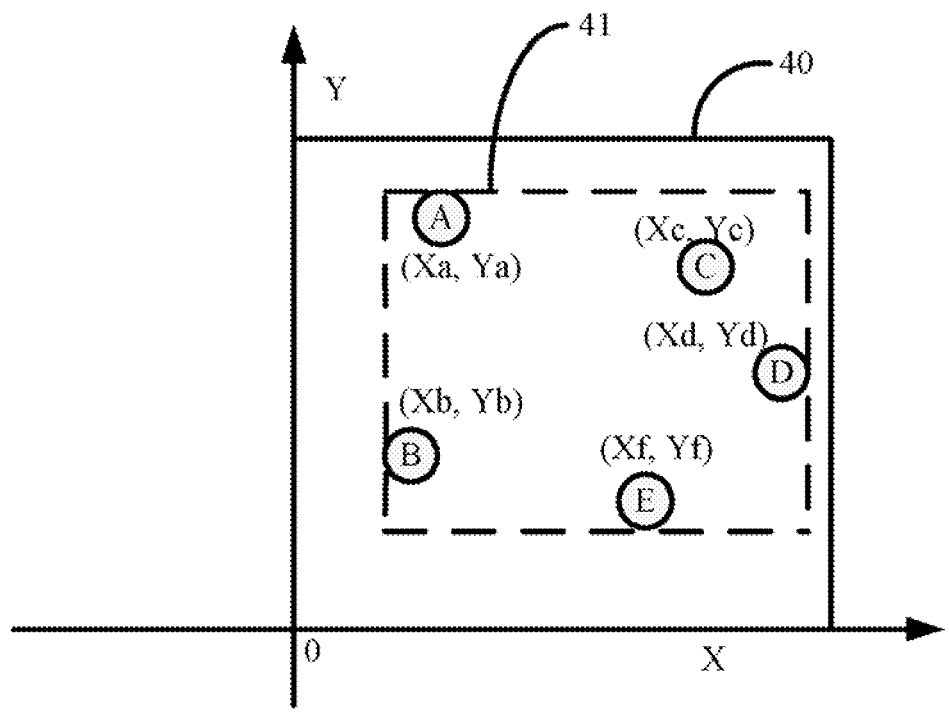
FIG. 2 shows a multi-touch input being recognized by the electronic device of FIG. 1.

For example, as shown in FIG. 2, there is a multi-touch input on the multi-touch display unit 40. The multi-touch input includes five touch points A, B, C, D and E. The five touch points A, B, C, D and E whose coordinates are respectively defined as (Xa, Ya), (Xb, Yb), (Xc, Yc), (Xd, Yd), and (Xe, Ye). The comparing module 33 compares the coordinate values of the five touch points and determines Xd as the maximum x coordinate value, Xb as the minimum x coordinate value, Ya as the maximum y coordinate value, and Yf as the minimum y coordinate value. The computing module 34 computes the x difference between the Xd and the Xb, computes the y difference between the Ya and the Yf, and computes the result of the x difference multiplying the y difference which is defined as the area of the touch area 41 formed by four dotted lines on the multi-touch display unit 40.

Figure 3:
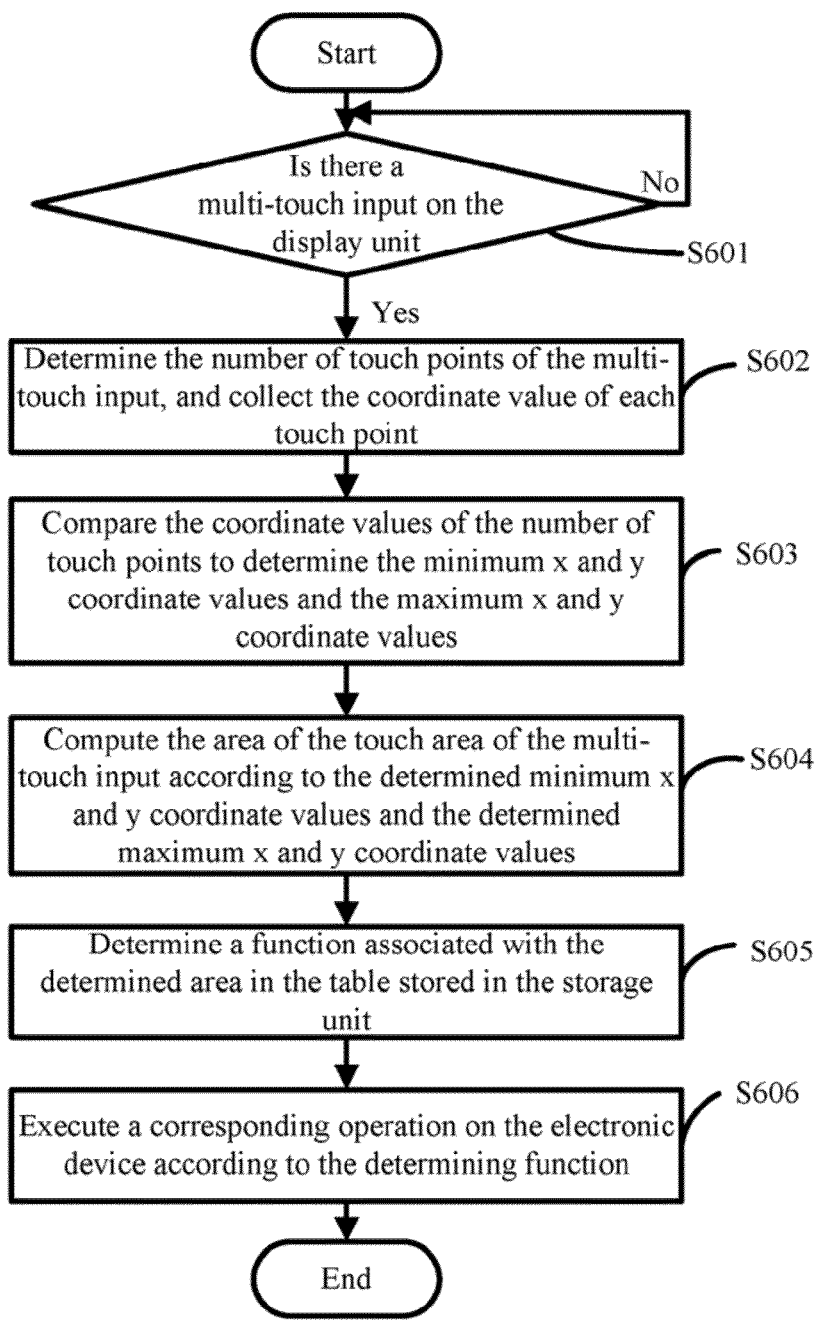
FIG. 3 is a flowchart of a method for recognizing multi-touch inputs implemented by the electronic device of FIG. 1, in accordance with exemplary embodiment.

FIG. 3 is a flowchart of a method for recognizing multi-touch inputs implemented by the electronic device of FIG. 1, in accordance with exemplary embodiment.

In step S601, the sensing module 31 senses whether there is a multi-touch input on the multi-touch display unit 40, if yes, the procedure goes to step S602, if no, the procedure goes to step S601.

In step S602, the collecting module 32 determines the number of touch points of the multi-touch input when there is the multi-touch input on the multi-touch display unit 40, and collects the coordinate value of each touch point.

In step S603, the comparing module 33 compares the coordinate values of the number of touch points to determine the minimum x and y coordinate values and the maximum x and y coordinate values.

In step S604, the computing module 34 computes the area of the touch area of the multi-touch input according to the determined minimum x and y coordinate values and the determined maximum x and y coordinate values.

In step S605, the function determining module 35 determines a function associated with the determined area in the table stored in the storage unit 20.

In step S606, the implementing module 36 executes a corresponding operation on the electronic device 1 according to the determining function.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device with a function of recognizing multi-touch inputs, comprising:
   a multi-touch display unit;
   an input unit to receive multi-touch inputs on the multi-touch display unit, wherein each multi-touch input comprises a plurality of touch points which forms a touch area;
   a storage unit to store a table which records a relationship between an area of the touch area of the multi-touch input and a function of the electronic device; and
   a processing unit to sense whether there is a multi-touch input on the multi-touch display unit, compute the area of the touch area of the multi-touch input when there is a multi-touch input on the multi-touch display unit, and execute a function associated with the computed area in the table stored in the storage unit.

2. The electronic device as described in claim 1, wherein the processing unit comprises:
   a sensing module to sense whether there is a multi-touch input on the multi-touch display unit;
   a collecting module to determine the plurality of touch points of the multi-touch input when there is a multi-touch input on the display unit, and collecting a coordinate value of each touch point;
   a comparing module to compare the coordinate values of the plurality of touch points to determine the minimum x and y coordinate values and the maximum x and y coordinate values;
   a computing module to compute the area of the touch area of the multi-touch input according to the determined minimum x and y coordinate values and the determined maximum x and y coordinate values;
   a function determining module to determine the function associated with the determined area in the table stored in the storage unit; and
   an implementing module to execute a corresponding operation on the electronic device according to the determined function.

3. The electronic device as described in claim 2, wherein the computing module is configured to compute a x difference between the maximum x coordinate value and the minimum x coordinate value, compute a y difference between the maximum y coordinate value and the minimum y coordinate value, and compute a result of the x difference multiplying the y difference which is defined as the area of the touch area of the multi-touch input.

4. A method for recognizing multi-touch inputs implemented by an electronic device, wherein the electronic device comprises a multi-touch display unit, an input unit for receiving multi-touch inputs on the multi-touch display unit, and a storage unit, each multi-touch input comprises a plurality of touch points which forms a touch area, the storage unit is configured to store a table which records a relationship between an area of the touch area of the multi-touch input and a function of the electronic device, the method comprising:
   sensing whether there is a multi-touch input on the multi-touch display unit;
   determining the plurality of touch points of the multi-touch input when there is a multi-touch input on the display unit, and collecting a coordinate value of each touch point;
   comparing the coordinate values of the plurality of touch points to determine the minimum x and y coordinate values and the maximum x and y coordinate values;
   computing the area of the touch area of the multi-touch input according to the determined minimum x and y coordinate values and the determined maximum x and y coordinate values;
   determining a function associated with the determined area in the table stored in the storage unit; and
   executing a corresponding operation on the electronic device according to the determined function.

5. The method as described in claim 4, wherein the method for computing the area of the touch area further comprises:
   computing a x difference between the maximum x coordinate value and the minimum x coordinate value;
   computing a y difference between the maximum y coordinate value and the minimum y coordinate value; and
   computing a result of the x difference multiplying the y difference which is defined as the area of the touch area of the multi-touch input.

\* \* \* \* \*